(12) United States Patent
White et al.

(10) Patent No.: US 6,646,863 B1
(45) Date of Patent: Nov. 11, 2003

(54) SEMI-PRIVATE INTERNET KIOSK (75) Inventors: Todd D. White, Hermosa Beach, CA (US); Andy Vong, Venice, CA (US); Dennis Deacon, Carpenteria, CA (US)

(73) Assignee: Neptune Networks, Inc., Los Angeles, CA (US)

( * ) Notice: Subject to any disclaimer, the term of this patent is extended or adjusted under 35 U.S.C. 154(b) by 62 days.

(21) Appl. No.: 10/039,891

(22) Filed: Oct. 26, 2001

Related U.S. Application Data (60) Provisional application No. 60/243,698, filed on Oct. 26, 2000.

(51) Int. Cl.[7] .............................................. G06F 1/00
(52) U.S. Cl. ...................... 361/680; 361/683; 700/237; 395/20
(58) Field of Search .................... 361/680, 683, 361/684–685, 689, 724–729, 743, 752; 109/24.1, 11, 1 R; 235/379, 380, 381; 395/18, 20, 22; 340/706, 709, 825.31, 825.33; 700/233, 236–238; 707/100–104; 345/32, 113, 133; 348/839–845, 832; 359/483, 485, 493, 501, 601, 900; 312/223.3, 235.5, 235.9, 240; 297/147, 172, 174, 135, 217, 188; D20/10, 39, 40, 42; D14/103, 106, 113, 124–129

(56) References Cited

U.S. PATENT DOCUMENTS 5,275,482 A * 1/1994 Grant ...................... 312/235.9
5,740,744 A * 4/1998 Nashirozawa et al. ...... 109/24.1
5,993,216 A * 11/1999 Stogner ........................ 434/29
6,078,848 A * 6/2000 Bernstein et al. ........... 700/237
D436,630 S * 1/2001 Gonsiorowski et al. ...... D20/10
6,205,716 B1 * 3/2001 Peltz .......................... 52/36.2
6,262,843 B1 * 7/2001 Marx ......................... 359/501
D461,505 S * 8/2002 Bain et al. ................... D20/10

FOREIGN PATENT DOCUMENTS

| EP | 000120771 A2 | * | 10/1984 | ............. G06F/1/00 |
| EP | WO 02/05176 A1 | * | 1/2002 | ............. G06F/17/60 |
| JP | 02001084052 A | * | 3/2001 | ............. G06F/1/00 |

* cited by examiner

Primary Examiner—Michael Datskovsky
(74) Attorney, Agent, or Firm—Knobbe, Martens, Olson & Bear, LLP (57) ABSTRACT An embodiment of the present invention includes a kiosk having a computer system therein that allows a seated person to access a computer network, such as the Internet. A hinged keyboard retracts into the kiosk to preserve space when not in use. The hinged keyboard is advantageously protected from damage, by a breakaway mechanism that allows the keyboard to pivot away from a position upon the application of a relatively damaging force. A retractable wing door further provides a level of privacy for the user. When closed, the hinged keyboard and the retractable wing door further enclose the computer system in a protected shell.

24 Claims, 11 Drawing Sheets

SEMI-PRIVATE INTERNET KIOSK

RELATED APPLICATION

This application claims the benefit under 35 U.S.C. §119(e) of U.S. Provisional Application No. 60/243,698, filed Oct. 26, 2000, the entirety of which is hereby incorporated by reference.

BACKGROUND OF THE INVENTION

1. Field of the Invention

The present invention is generally related to kiosks. In particular, the present invention relates to kiosks that can provide access to the Internet.

2. Description of the Related Art

Today's corporations and the general public have come to expect communications to flow in an almost instantaneous rate and in a multi-media format that attracts and maintains the attention of viewers. With the explosive growth of the Internet, companies and consumers alike have grown accustomed to using the Internet to conduct time saving purchases and reservations from anywhere and at anytime during daily life.

While Internet access is widely available in a business environment and at home, Internet access is often difficult to find or expensive to obtain while traveling. Travelers often desire convenient access to the Internet. One method for obtaining access to the Internet is through a kiosk.

An Internet kiosk is a publicly accessible kiosk with a computer system that can access the Internet through a network connection. The network connection can be established through phone lines with modems, ISDN lines, DSL lines, cable modems, proxy servers, T1 connections, and the like.

Existing Internet kiosks lack convenience. Existing Internet kiosks are physically large and bulky machines and are typically located along walls and corners of building much like an automated teller machine (ATM). Typical Internet kiosks accommodate the user while the user is standing. Standing for a lengthy interval can become tiresome particularly when the user has been traveling for an extended period. Existing Internet kiosks also do not provide very much privacy. Privacy can be important for sensitive business information, personal email message, and to protect the identity of charge account numbers.

SUMMARY OF THE INVENTION

Embodiments of the present invention overcome the disadvantages of existing Internet kiosks by providing a compact kiosk that a user can access in a comfortable seated position, and by providing a level of privacy that allows the user to access the Internet without inadvertently divulging confidential information.

An embodiment of the present invention includes a kiosk having a computer system therein that allows a seated person to access a computer network, such as the Internet. A hinged keyboard retracts into the kiosk to preserve space when not in use. The hinged keyboard is advantageously protected from damage by a breakaway mechanism that allows the keyboard to pivot away from a position upon the application of a relatively damaging force. A retractable wing door further provides a level of privacy for the user. When closed, the hinged keyboard and the retractable wing door further enclose the computer system in a protected shell.

One kiosk according to an embodiment of the present invention includes a housing wherein a keyboard and a wing door retractably close into the housing. When closed, the kiosk provides a low and narrow profile and a small footprint to save space and to permit the advantageous close proximity to seating, such as the seats of an airport terminal. When open, the keyboard permits the user to type in data and the wing door provides the user with a measure of privacy. In one embodiment, the kiosk includes a torque sensitive assembly to protect the keyboard from an excessive force. For example, when a relatively heavy object is hung on the keyboard, the torque sensitive assembly allows the keyboard to recoverably pivot down to protect the keyboard from breaking and advantageously reduces the likelihood of a maintenance call. The kiosk can further include a credit card reader that allows a user to enter a credit card number and related information with a quick swipe, thereby preventing a thief from observing the credit card number, which might occur with the manual entry of the credit card number on a keyboard.

A keyboard according to an embodiment of the invention can repetitively "break away," that is, pivot to a safe position, from a higher than normally encountered load to protect the keyboard from a potentially damaging load. A higher than normal load can be encountered when, for example, a user hangs a heavy object on the keyboard. In one embodiment, the threshold for breakaway is approximately 25 foot-pounds. The breakaway mechanism can comprise a rounded plunger, such as a rounded rod or a ball bearing, that is pressed against a deformation in a plate with a spring. The plunger maintains the keyboard in a user-friendly ergonomic position until the application of the breakaway force, upon which the plunger retracts against the spring and the keyboard breaks away to protect against the load.

BRIEF DESCRIPTION OF THE DRAWINGS

These and other features of the invention will now be described with reference to the drawings summarized below. These drawings and the associated description are provided to illustrate preferred embodiments of the invention, and not to limit the scope of the invention.

DETAILED DESCRIPTION OF PREFERRED EMBODIMENTS

Although this invention will be described in terms of certain preferred embodiments, other embodiments that are apparent to those of ordinary skill in the art, including embodiments which do not provide all of the benefits and features set forth herein, are also within the scope of this invention. Accordingly, the scope of the present invention is defined only by reference to the appended claims.

Figure 1:
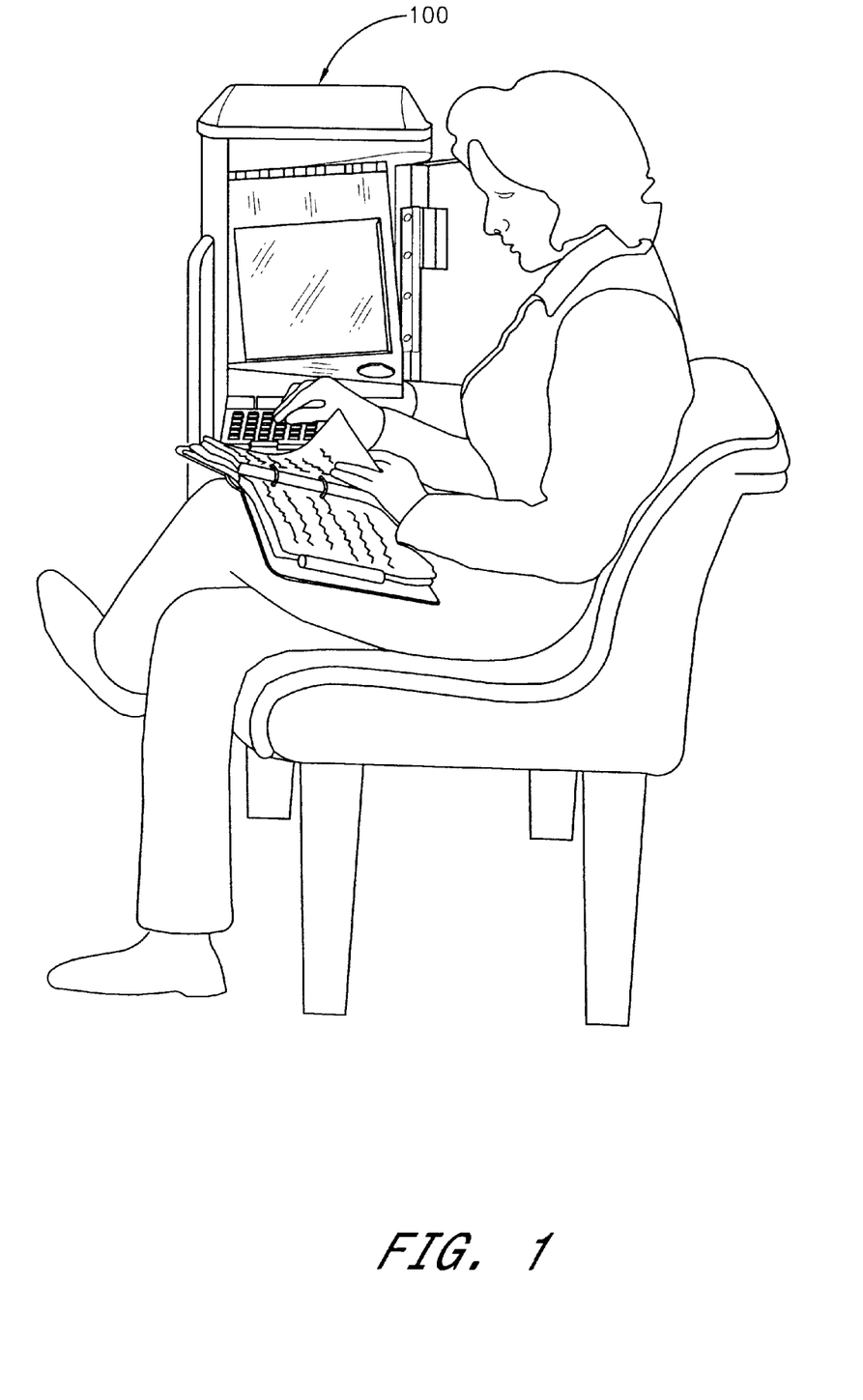
FIG. 1 is a perspective view of a kiosk according to an embodiment of the invention in an open position illustrating a user accessing the kiosk.

FIG. 1 illustrates a user interacting with a kiosk 100. The kiosk 100 is advantageously adapted to allow the user to access the terminal while in a seated position.

Figure 2:
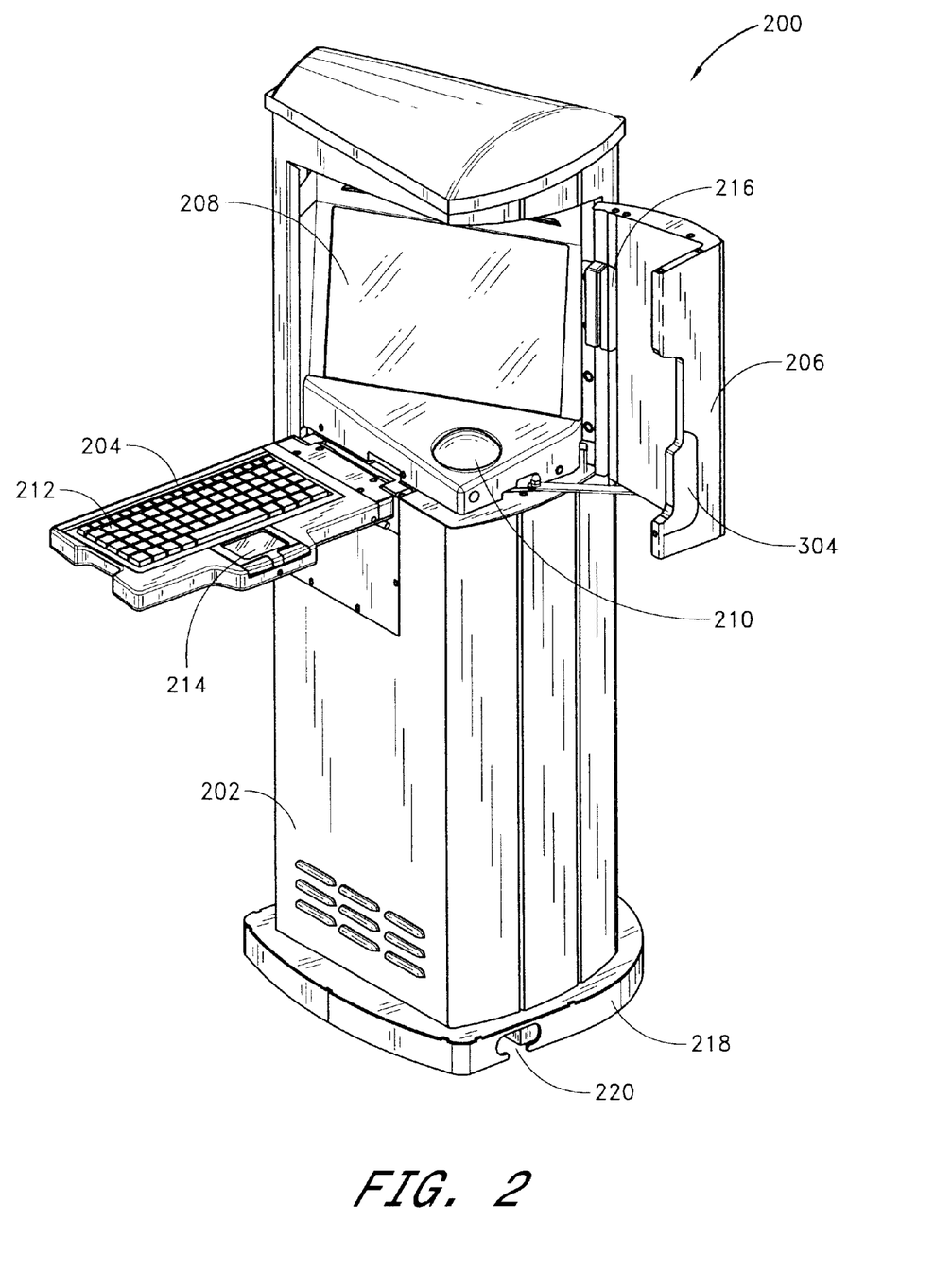
FIG. 2 is a perspective view of a kiosk according to an embodiment of the invention in an opened state.

FIG. 2 illustrates a perspective view of a kiosk 200 according to an embodiment of the invention, where the kiosk 200 is in an opened state. Of course, it will be understood by one of ordinary skill in the art that other embodiments of the invention include embodiments that are the mirror image of the embodiments shown and described herein.

A housing 202 of the kiosk 200 contains the computer system. In its opened state, a keyboard assembly 204 folds down and a wing door 206 swings out from the housing 202 to expose a display device 208, a speaker 210, a keyboard 212, a pointing device 214, and a card reader 216 to the user.

When opened, the wing door 206 further provides a significant level of privacy by obscuring a portion of the display device 208 from a curious onlooker.

The display device 208 can include a cathode ray tube (CRT) or a flat panel display such as a liquid crystal display (LCD) or an active matrix screen. The display device 208 is mounted in or behind an aperture in the housing for user viewing. The aperture can be left open or can include a glass or plastic window covering the display to protect the display screen from dust, spilled drinks, and the like. In one embodiment, the glass or plastic window is a screen filter adapted to limit a field of view to a narrow angle, thereby further enhancing user privacy. An example of such a screen filter is the Security SlimScreen available from Kensington Technology Group.

The speaker 210 is located such that the speaker 210 is protected from the environment when the keyboard assembly 204 and the wing door 206 are retracted back into the housing 202. The speaker 210 is thereby protected against inadvertent damage. In another embodiment, the speaker 210 is on an exterior surface of the housing.

The keyboard 212 and pointing device 214 fold down with the keyboard assembly for access by the user. Of course, the pointing device 214 can also be located in another position, such as adjacent to the display device 208. It will be understood by one of ordinary skill in the art that the pointing device 214 can include a mouse, a trackball, a touch pad, a touch screen, or other like devices. One embodiment of the keyboard assembly includes a stop such that, when in the open position, the keyboard assembly is maintained in a generally horizontal position suitable for typing. The generally horizontal position can include a slight incline typical of a keyboard to further facilitate comfortable typing. In one embodiment, the keyboard assembly 204 optionally includes a torque limiting mechanism that will be described in greater detail in connection with FIG. 7.

The card reader 216 is located such that the card reader 216 is protected from the environment when the kiosk is closed and not in use. The card reader 216 provides a quick and efficient way for a consumer making an online purchase through the kiosk 200 to enter a credit card number. Likely physical locations for the kiosk 200 include public places, such as airport terminals, which may abound with people from all walks of life. Hence, the card reader 216 advantageously allows the consumer to enter the credit card number without typing in the credit card number and potentially exposing the credit card number to untrustworthy eyes.

The housing 202 is attached to a base 218, which can also be integrated with the housing 202. In one embodiment, the base 218 is fabricated from a 1.5-inch thick plate of steel, which provides the kiosk 200 with a sturdy platform and a low center of gravity to inhibit tipping. The base 218 can also define an aperture to allow the passage of cabling for power and network connections through the floor. A side aperture 220 can also permit the passage of cabling. The base 218 can further include provisions for bolting or otherwise anchoring the housing 202 to the floor.

Of course, elements of the kiosk 200 shown include both functional and ornamental features. The kiosk 200 can include a lid such as a domed lid 222. The domed lid 222, though stylish, also discourages users from resting objects such as drinks on top of the kiosk. Such drinks can otherwise easily fall if the kiosk 200 is bumped by, for example, a large piece of luggage. In other embodiments, the lid may be pyramid shaped or have advertising displays mounted thereon.

Figure 3:
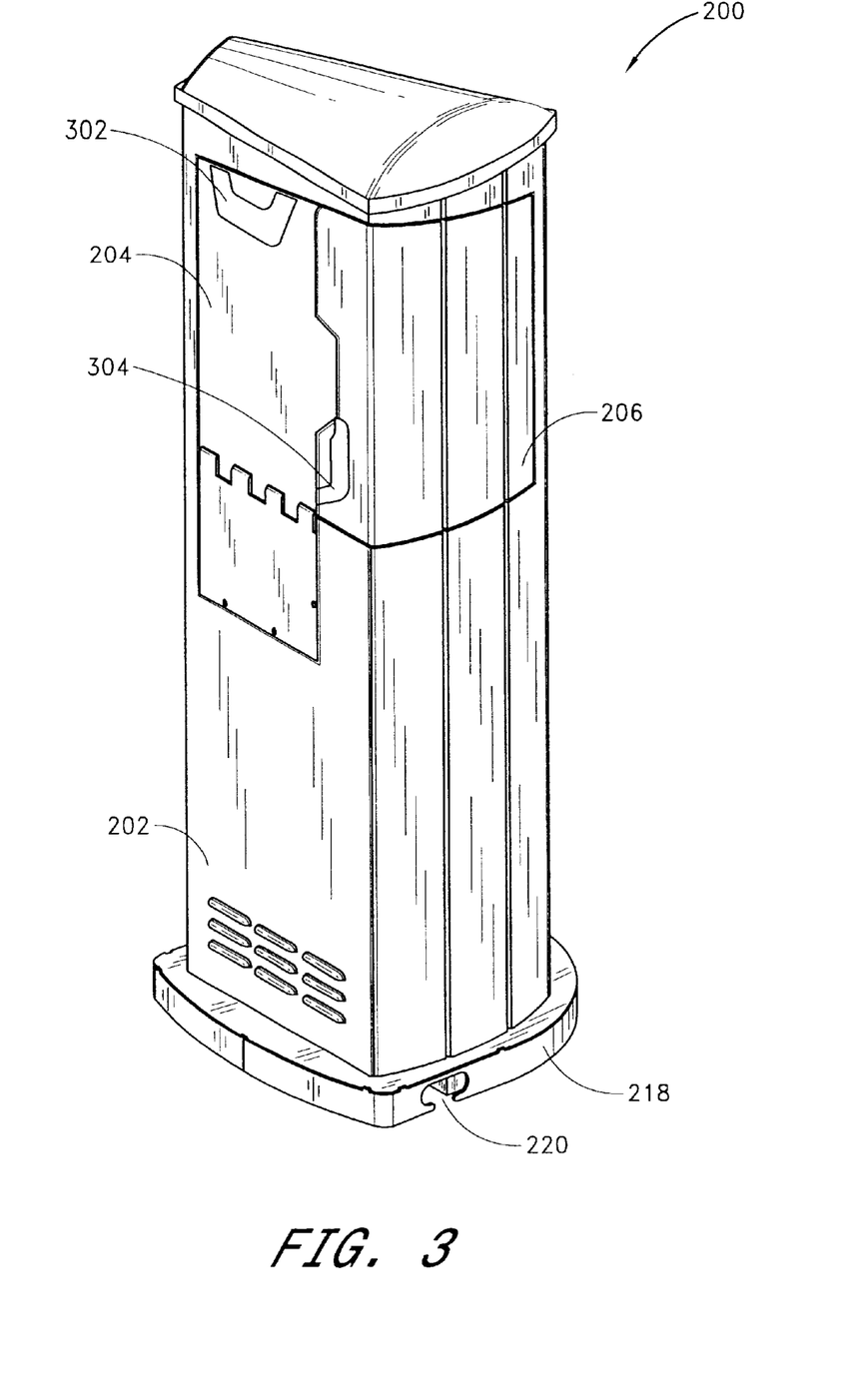
FIG. 3 is a perspective view of the kiosk of FIG. 2 in a closed state.

FIG. 3 illustrates a perspective view of the kiosk 200, where the kiosk 200 is in a closed state. In its closed state, the keyboard assembly 204 retracts to a generally vertical position and the wing door 206 retracts into the housing 202 to present a small or narrow profile to preserve space. A first handle 302 and a second handle 304 allow a user to conveniently pull down the keyboard assembly 204 and the open the wing door 206, respectively. The main body of the kiosk resembles a pie slice with a flattened end. The small profile allows the kiosk 200 to be strategically placed in advantageous locations, such as airport terminals, where the clientele can be favorable to making online purchases. By collapsing into the narrow profile, the kiosk 200 facilitates the ingress and egress of a seat adjacent to the kiosk 200. The kiosk 200 can thereby be used with existing seating to ease accommodation of the kiosk 200 into an existing environment.

The closed state also serves to enclose components such as the display device 208, the speaker 210, the keyboard 212, the pointing device 214, and the card reader 216 in a protective shell. The protective shell created by the housing 202, the keyboard assembly 204, and the wing door 206 advantageously reduces the exposure of sensitive 20 components of the kiosk 200 to damage during use, maintenance, and shipping and thereby lower maintenance costs of the kiosk 200.

The keyboard assembly 204 optionally includes a spring that applies a force to the keyboard assembly 204 to maintain the keyboard assembly 204 in the generally vertical position. In another embodiment, the keyboard assembly 204 is maintained in the generally vertical position with a latch.

Figure 4:
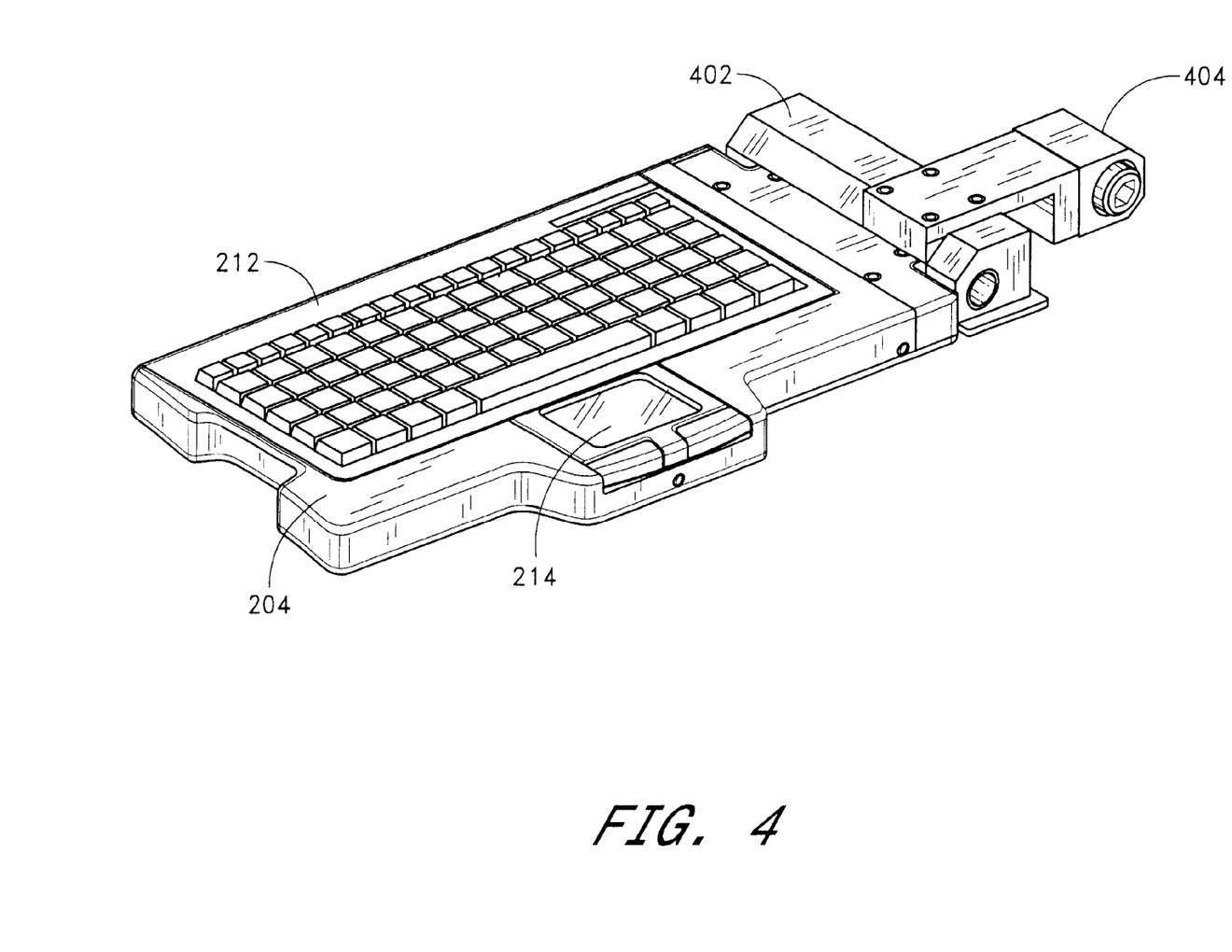
FIG. 4 illustrates a keyboard assembly in greater detail.
Figure 5:
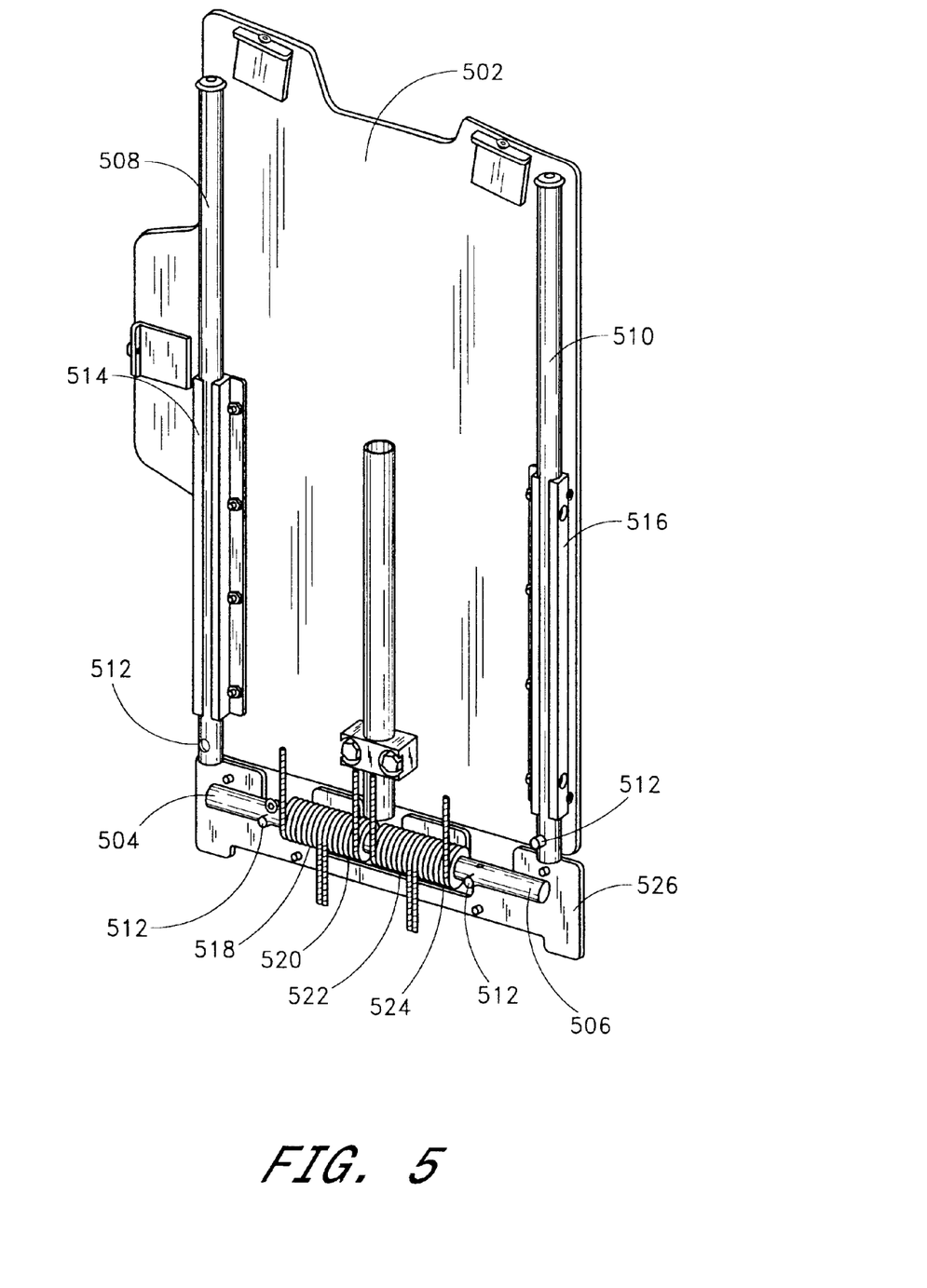
FIG. 5 illustrates a chassis of a keyboard assembly.
Figure 6:
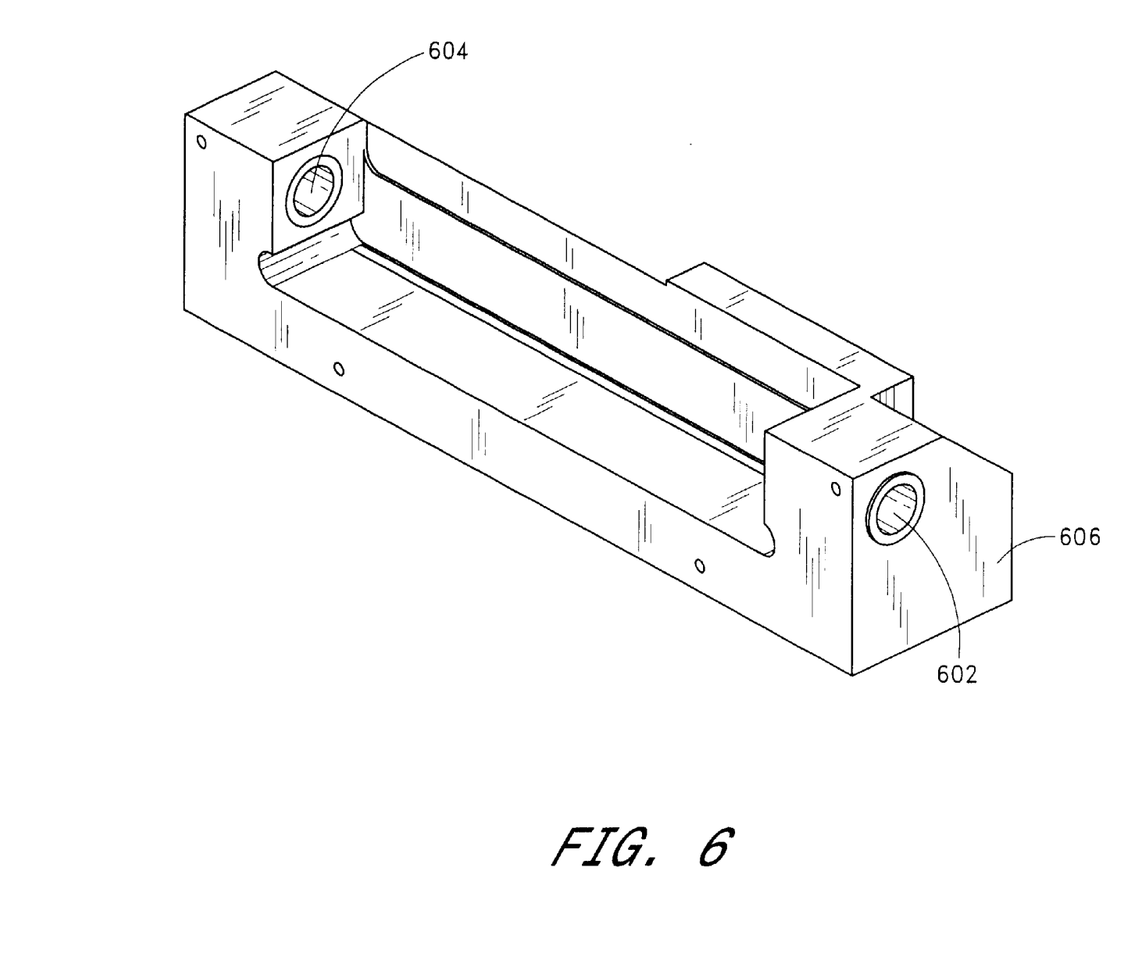
FIG. 6 illustrates a hinge block.

FIGS. 4, 5, and 6 illustrate certain aspects of the keyboard assembly 204 in greater detail. FIG. 4 illustrates the keyboard assembly 204 connected to a first hinge assembly 402 and a torque arm 404. The torque arm 404 and related components will be described in further detail in connection with FIG. 7.

First hinge assembly 402 allows the keyboard assembly 204 to pivot from the generally vertical closed position as shown in FIG. 3 to the generally horizontal open position as shown in FIG. 2.

FIG. 5 illustrates a keyboard chassis 502 that forms part of the keyboard assembly 204. The keyboard chassis 502 provides mounting points for hardware such as the keyboard 212 and the pointing device 214. The keyboard chassis 502 is rigidly coupled to a first and a second pin 504, 506, which form part of the first hinge assembly. In one embodiment, a connecting plate, which is not shown for clarity, couples the first and the second pins 504, 506 to a first and a second adjustment rod 508, 510 through screws 512. The first and the second adjustment rods 508, 510 are slidably coupled to the keyboard chassis 502 through a first and a second lockable guide 514, 516 to compensate for manufacturing tolerances and wear.

Torsion springs 518, 520, 522, and 524 maintain the keyboard assembly 204 in the generally vertical position when closed, and yet allow a user to pull the keyboard assembly 204 down to the generally horizontal open position. The tension of the torsion springs 518, 520, 522, and 524 is selected to be light enough to allow the weight of the keyboard assembly 204 to maintain the generally horizontal open position and yet strong enough to tend to maintain the keyboard assembly 204 in the generally vertical closed position. Suitable torsion springs 518, 520, 522, and 524 are part numbers 9287K47 and 9287K97, which are available from McMaster-Carr.

The first and the second pins 504, 506 rotate within a first and a second bore 602, 604, respectively, of a hinge block 606, which is shown in FIG. 6. In one embodiment, the first and the second pins 504, 506 are fabricated from steel and the first and the second bores 602, 604 are lined with bronze bushings. When the keyboard assembly has pivoted approximately 90 degrees from vertical, a stop plate 526 contacts the hinge block 606 to prevent further relative rotation at the first hinge assembly 402.

FIG. 7 illustrates one embodiment of the keyboard assembly 204 with a breakaway hinge. The breakaway hinge includes a breakaway chassis 702, a second hinge 704, a radial plate 706, and a plunger assembly 708. The breakaway chassis 702 attaches to the housing 202 and also attaches to the first hinge assembly 402. The keyboard assembly 204 is thereby coupled to the housing 202 through the first hinge assembly 402 and the breakaway chassis 702.

Figure 7A:
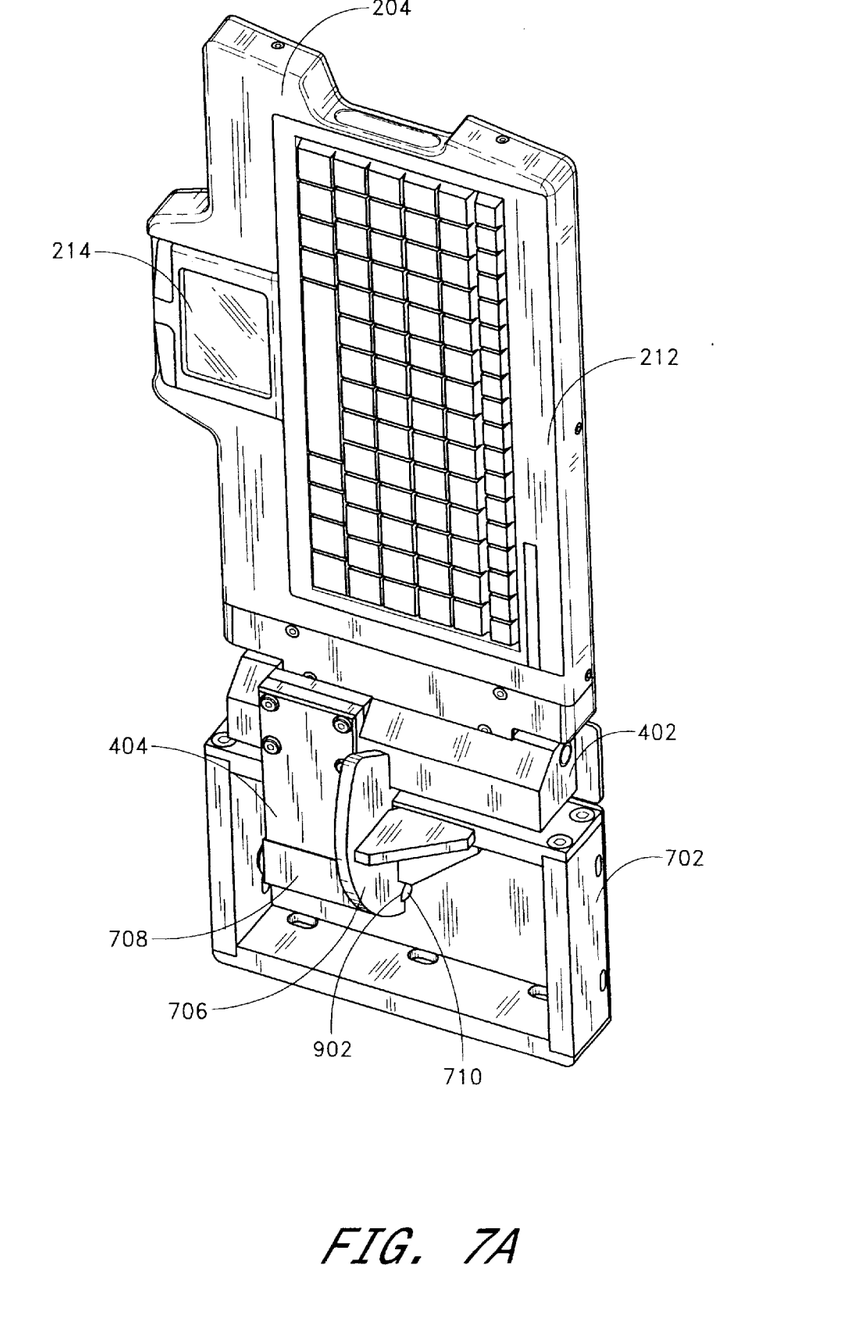
FIG. 7 consists of FIGS. 7A, 7B, and 7C and illustrates the keyboard assembly with a breakaway hinge.
Figure 7B:
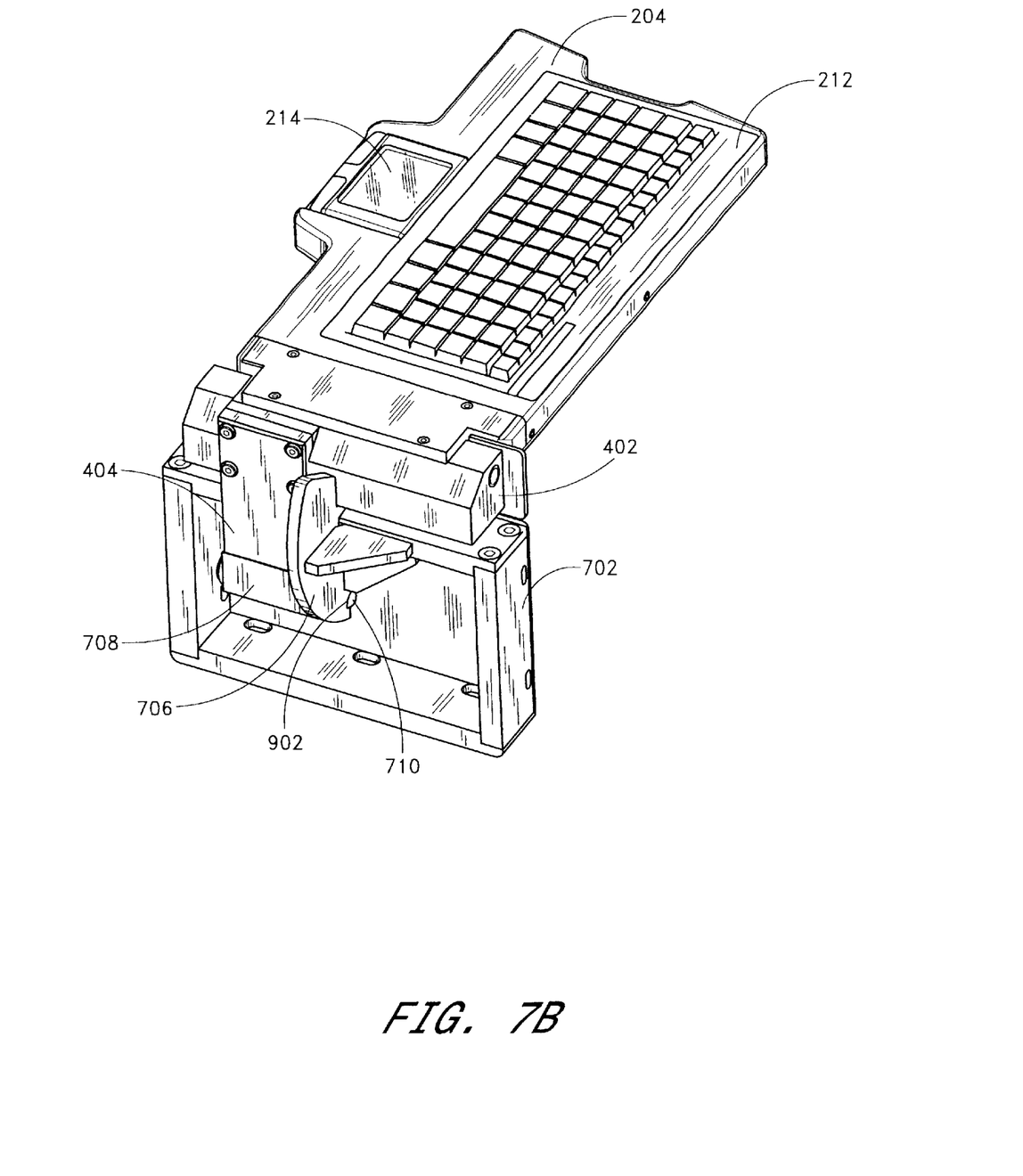

During normal use, the keyboard assembly 204 transitions from its generally vertical closed position, as shown in FIG. 7A, to its generally horizontal open position, as shown in FIG. 7B, by pivoting at the first hinge assembly 402. When the keyboard assembly 204 is in both the generally vertical closed and the generally horizontal open positions, the second hinge 704 is closed and a retractable tip 710 of the plunger assembly 708 is situated in a cutout portion 902 of the radial plate 706.

Figure 7C:
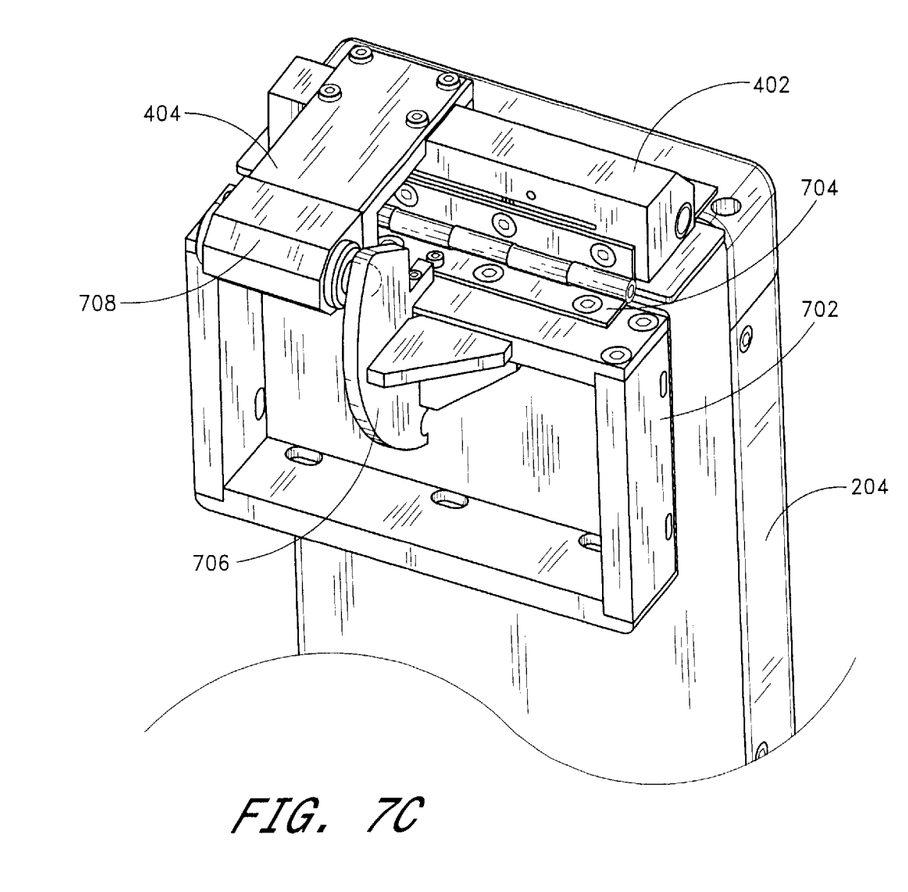

Upon the application of a relatively high force to the keyboard assembly 204, the second hinge 704 opens to relieve the force on the keyboard assembly 204, as shown in FIG. 7C, to protect the keyboard assembly 204 from damage. The relatively high force can arise under conditions such as a person leaning on the keyboard assembly 204, the resting or hanging of a heavy object, such as luggage, on the keyboard assembly 204, and the like. By protecting the keyboard assembly 204 from damage, the breakaway hinge can reduce costly maintenance calls.

The second hinge 704 opens and allows the keyboard assembly 204 to break away when the force applied to the keyboard assembly 204 creates a torque along the second hinge 704 that is high enough to overcome the resistance of the plunger assembly 708 action on the radial plate 706. When the keyboard assembly 204 breaks away, the keyboard assembly 204 is still coupled to the housing 202 through the second hinge 704 and the breakaway chassis 702. In one embodiment, the breakaway torque is set to approximately 25 foot-pounds. Of course, the breakaway torque can be set to other values depending on, for example, the weight and length of the keyboard assembly 204, and the relative strengths of components within the keyboard assembly 204 and the housing 202. In one embodiment, the second hinge 704 is part number S07415018S10-7200 from Ladeau Hinge Company.

The force applied to the keyboard is transferred to the plunger assembly 708 through the torque arm 404. Under normal operating conditions, the second hinge 704 remains closed and the retractable tip 710 of the plunger assembly 708 is maintained within the cutout portion 902 of the radial plate 706. A plunger spring within the plunger assembly 708 applies pressure to the retractable tip 710 such that the retractable tip 710 resists motion out of the cutout portion 902 and thereby maintains the opened keyboard assembly 204 in the generally horizontal position.

The retractable tip 710 is rounded and the cutout portion 902 beveled such that upon an application of a sufficient force to the plunger assembly 708, the retractable tip 710 overcomes the force of the plunger spring and retracts into the plunger assembly 708. When the retractable tip 710 retracts into the plunger assembly 708, the second hinge 704 can open to allow the keyboard assembly 204 to further pivot away from a relatively high load.

Figure 8:
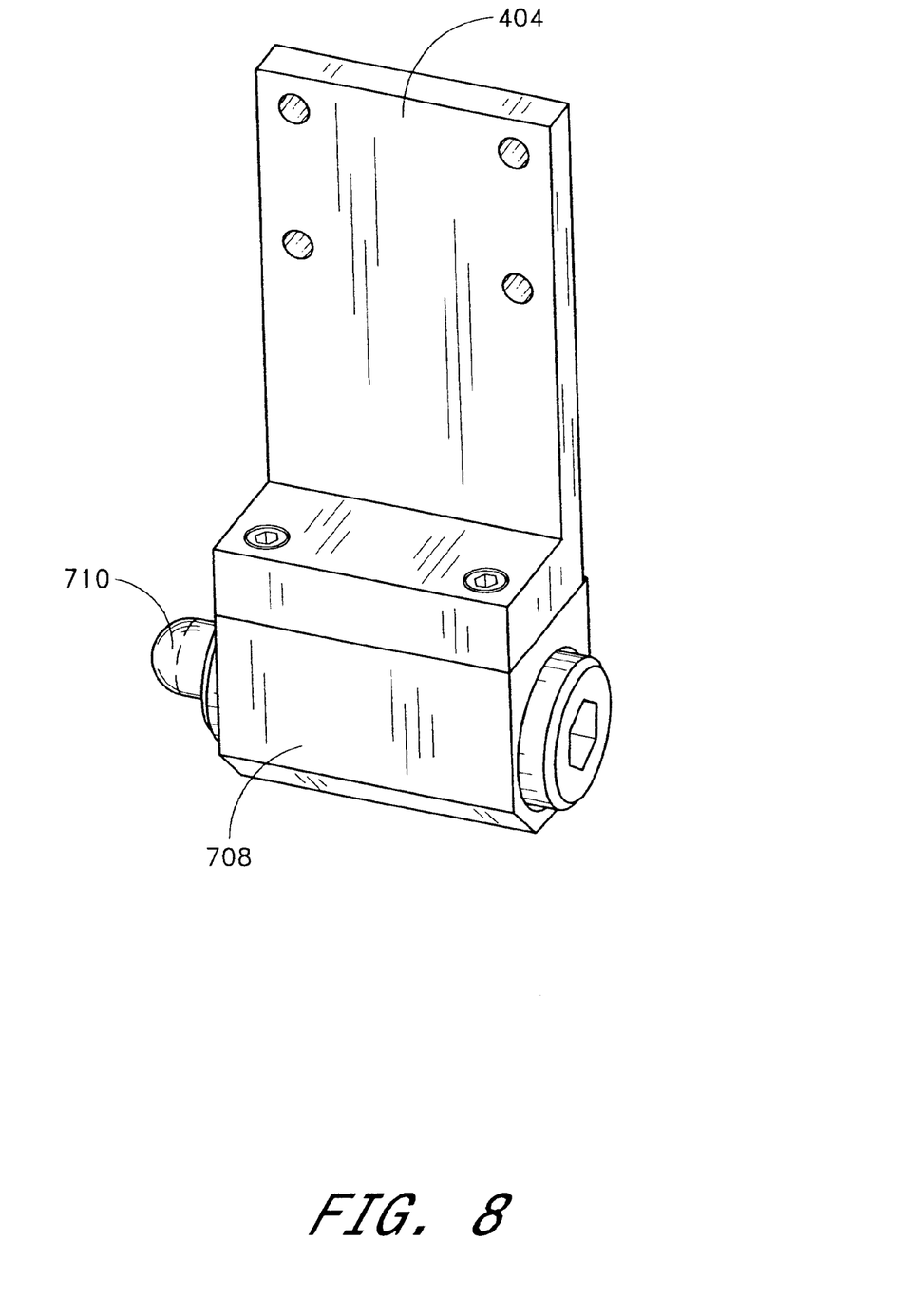
FIG. 8 illustrates a plunger assembly.

FIG. 8 illustrates further detail of the plunger assembly 708. The plunger assembly 708 can attach to the torque arm 404 with bolts, screws, adhesives, and the like. Centering dowel pins can also be used to align the plunger assembly 708 with the torque arm 404. In one embodiment, the retractable tip 710 of the plunger assembly 708 is formed from a rounded rod that is retained within the plunger assembly 708. The plunger spring within the plunger assembly 708 applies outward force on the retractable tip 710. In one embodiment, the retractable tip 710 is a ball bearing.

Figure 9:
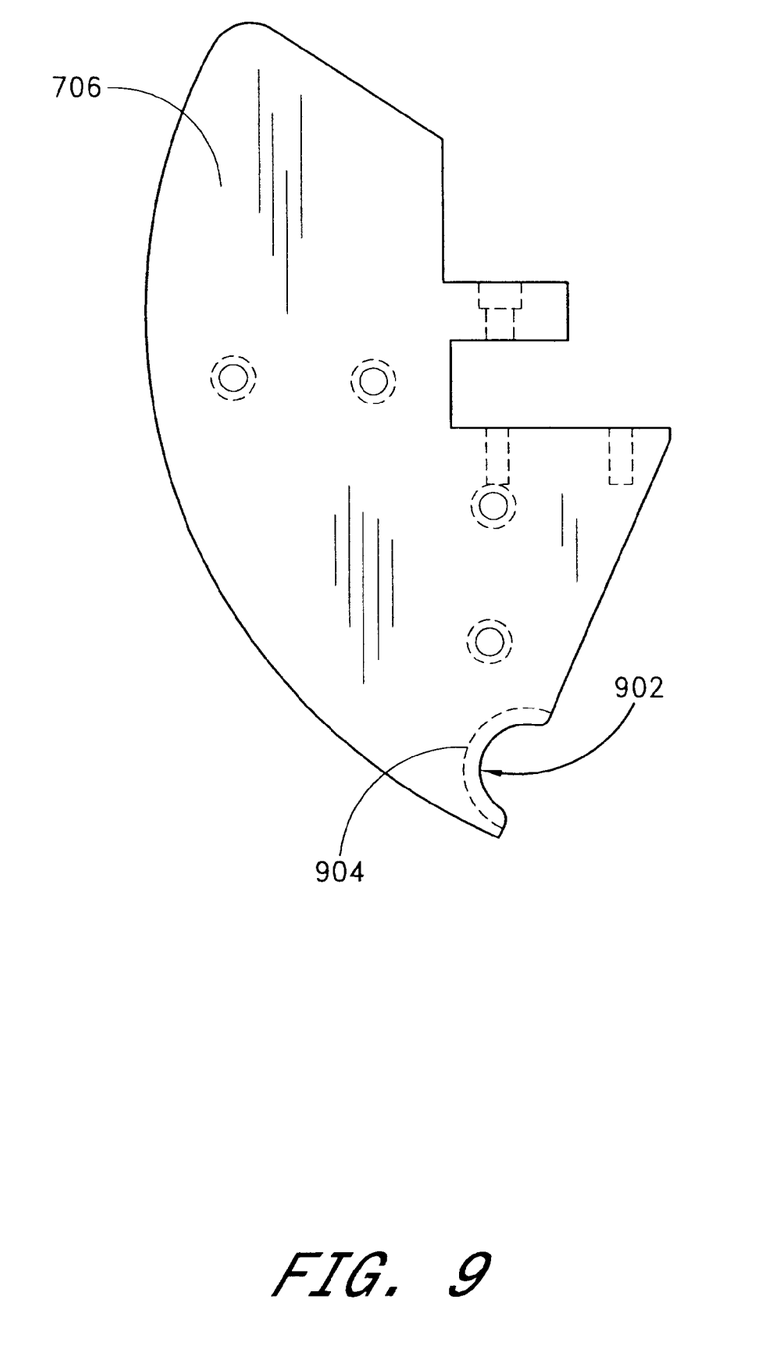
FIG. 9 illustrates a radial plate.

FIG. 9 illustrates one embodiment of the radial plate 706. The radial plate 706 includes the cutout portion 902, which accommodates the retractable tip 710 during normal use. Dashed curve 904 indicates a beveled surface. The plate can be constructed from a variety of suitable materials including 0.25-inch thick 6061-T6 aluminum plate. In one embodiment, the cutout portion 902 is instead a groove, notch, or other form of depression.

Various embodiments of the present invention have been described above. Although this invention has been described with reference to these specific embodiments, the descriptions are intended to be illustrative of the invention and are not intended to be limiting. Various modifications and applications may occur to those skilled in the art without departing from the true spirit and scope of the invention as defined in the appended claims.

What is claimed is:

1. A kiosk for providing convenient access to the Internet, the kiosk comprising:

a housing extending in a generally vertical direction, the housing adapted to store a display device and a computer system therein, where a base of the housing is adapted to securely mount the housing to a floor, the base further defining at least one aperture adapted to pass electrical cabling therein;

a keyboard coupled to the housing with a first hinge, where the first hinge is adapted to pivot the keyboard along the first hinge from a closed position to an opened position, where the keyboard includes a typing surface and a backside surface, where the keyboard pivots to the closed position in a first generally vertical position such that when the keyboard is closed, the typing surface of the keyboard faces inward and the backside surface is substantially flush with an exterior the housing, where the keyboard includes a spring adapted to maintain the keyboard in the closed position, where the keyboard further includes a stop adapted to maintain the keyboard in a generally horizontal open position, where the keyboard closes such that when in the closed position, the keyboard conceals at least a first portion of the display device from outside the kiosk, and where the keyboard opens such that when in the open position, the first portion of the display device is visible from outside the kiosk; and a wing door coupled to the housing with a second hinge, where the second hinge is adapted to pivot the wing door along the second hinge from a closed position and to an opened position, where an exterior surface of the wing door is substantially flush with the housing when the wing door is in the closed position, where at least a second portion of the display device is concealed when the wing door is in the closed position, where the second portion of the display device is revealed when the display device is in the opened position.

2. The kiosk as defined in claim 1, wherein the keyboard is further adapted to pivot from the generally horizontal open position to a second generally vertical position to protect the keyboard upon an application of a forceful downward load from breakage.

3. The kiosk as defined in claim 2, wherein the keyboard pivots to the second generally vertical position through a third hinge coupled to the keyboard.

4. The kiosk as defined in claim 1, wherein the kiosk is further adapted to provide access to a user in a seated position, where a screen height is approximately at an eye-level height, and where the keyboard is easily accessible to the seated user's hands.

5. The kiosk as defined in claim 1, further comprising a privacy screen to substantially prevent a person seated adjacent to a user from viewing the display device.

6. The kiosk as defined in claim 1, wherein an axis defined by the first hinge is approximately at a right angle to an axis defined by the second hinge.

7. The kiosk as defined in claim 1, further comprising a credit card reader coupled to the computer system and adapted to allow a user to enter the user's credit card information.

8. The kiosk as defined in claim 1, further comprising a headset including a speaker and a microphone, where the headset is adapted to allow the user to send and receive voice messages over the Internet.

9. The kiosk as defined in claim 1, further comprising an infra-red (IR) port adapted to interface with a personal digital assistant (PDA).

10. The kiosk as defined in claim 1, further comprising an input/output port adapted to interface with a laptop computer.

11. The kiosk as defined in claim 1, further comprising a domed top coupled to the housing to discourage the placement of objects thereupon.

12. The kiosk as defined in claim 1, wherein an upper portion of the housing is configured to discourage the placement of objects thereupon.

13. A kiosk for providing convenient access to the Internet, the kiosk comprising:

a display device;

a CPU unit adapted to interface with the Internet to retrieve Web pages and display the Web pages on the display device;

a generally vertical housing that is adapted to store the display device and the CPU unit, where the housing further defines an aperture adapted allow a user to view the display device such that a user's viewing angle is substantially normal to a surface of the display device;

a keyboard coupled to the housing and adapted to swing open to allow a user to access keys of the keyboard, where the keyboard is further adapted to interface with the CPU unit, and where the keyboard is further adapted to swing closed to save space and to protect the keys from inadvertent damage; and a privacy cover coupled to the housing, where the privacy cover is adapted to extend outwardly from the housing such that the privacy cover obscures a covered viewing angle from at least one side of the display device where the covered viewing angle is greater than about 30 degrees from a vector normal to the surface of the display device.

14. The kiosk as defined in claim 13, wherein the aperture further comprises a plate of glass.

15. A keyboard mounting assembly suited to permit relatively permanent attachment of a keyboard to a structure, the keyboard mounting assembly comprising:

a housing adapted to hold the keyboard such that the keyboard is securely maintained within the housing regardless of an orientation of the housing;

a hinge assembly coupled to the housing, where the hinge assembly is adapted to couple the housing to the structure, and where the hinge assembly is further adapted to pivot the housing along the hinge with respect to the structure; and a torque limiting assembly coupled to the housing, where the torque limiting assembly is adapted to maintain a position of the housing relative to the structure, where the torque limiting assembly is further adapted to release, without damage to the torque limiting assembly, the maintained position of the housing upon the application of a load to the keyboard assembly that causes a torque between the keyboard assembly and the structure to exceed a predetermined torque, where the predetermined torque is higher than a first torque approximately derived from a sum of the weight of the keyboard, the keyboard assembly, and the load applied to the keyboard assembly, and where the predetermined torque is lower than a second torque that would otherwise result in damage to the keyboard assembly if not for the action of the torque limiting assembly.

16. The keyboard assembly as defined in claim 15, wherein the predetermined torque is approximately 25 foot-pounds.

17. The keyboard assembly as defined in claim 15, wherein the torque limiting assembly is integrated with the hinge assembly.

18. The keyboard assembly as defined in claim 15, wherein the housing is further adapted to hold a pointing device.

19. The keyboard assembly as defined in claim 15, further comprising a spring assembly adapted to apply a force to the housing such that when the torque limiting assembly has released, the spring assembly applies force in the direction of the previously maintained position.

20. The keyboard assembly as defined in claim 15, wherein the predetermined torque applies only in a first rotation direction and not in a second rotation direction, such that the torque assembly offers nominal resistance to movement in the second rotational direction.

21. The keyboard assembly as defined in claim 15, wherein the torque limiting assembly further comprises:

a torque application member adapted to transfer the torque between the keyboard assembly and the structure to a radially extending force;

a plunger coupled to the torque application member, where the plunger includes a substantially rounded tip that extends from the plunger in a first axis that is perpendicular to the direction of the radially extending force, and where the tip is adapted to move along the first direction;

a substantially rigid plate with a deformation, where the deformation is adapted to accommodate the tip of the plunger to maintain the position of the housing relative to the structure; and a spring coupled to the plunger adapted to apply a spring force to the tip along the first axis such that the radially extending force that overcomes the spring force and displaces the tip in a direction opposite to the spring force corresponds to the predetermined torque.

22. The keyboard assembly as defined in claim 21, wherein the deformation in the plate comprises a cutout.

23. The keyboard assembly as defined in claim 21, wherein the plunger is a ball bearing.

24. A kiosk for providing convenient access to the Internet, the kiosk comprising:

means for storing a display device and a computer system;

means for coupling the storage means to a floor, where the floor coupling means further permits electrical cabling to pass through to the floor;

means for rotatably coupling the storage means to a keyboard such that the keyboard pivots from a closed position to an opened position;

means for maintaining the keyboard in the closed position to decrease a footprint of the kiosk and to protect the keyboard from damage;

means for maintaining the keyboard in the open position to expose the keyboard to a user;

means for protecting the keyboard while in the open position, the protecting means allowing the keyboard to pivot away from a predetermined applied force; and means for shielding a portion of the display device from an onlooker other than the user, where the shielding means couples to the storage means and pivots along a second axis with respect to the storage means from a closed position to an opened position, where in the closed position, the shielding means is substantially flush with the storage means, and where in the open position, the shielding means obscures the portion of the display device from the onlooker.

* * * * *